United States Patent [19]
Zanoni

[11] 4,074,937
[45] Feb. 21, 1978

[54] OPTICAL MEASURING DEVICE

[75] Inventor: Carl A. Zanoni, Middletown, Conn.

[73] Assignee: Zygo Corporation, Middlefield, Conn.

[21] Appl. No.: 656,177

[22] Filed: Feb. 9, 1976

[51] Int. Cl.$^2$ .......................... G01B 9/02; G01B 11/26
[52] U.S. Cl. ...................................... 356/109; 356/153
[58] Field of Search ........................ 356/109, 112, 153

[56] References Cited

U.S. PATENT DOCUMENTS

| 3,028,782 | 4/1962 | Bernhardt et al. | 356/109 |
| 3,782,829 | 6/1972 | Herriott | 356/153 |

OTHER PUBLICATIONS

Polhemus; C. et al., "Method for Subtracting Phase Errors in an Interferometer", Applied Optics, vol. 10, No. 2, pp. 441-442 (Feb. 1971).

*Primary Examiner*—Conrad J. Clark

[57] ABSTRACT

A lens system which has a built-in reference surface and which provides an emerging wavefront of variable radius of curvature useful in a Fizeau interferometer or a differential autocollimator is described. By interposing between the reference surface and the test surface a collimating lens whose distance from the reference surface can be varied, an emerging wavefront is produced whose radius of curvature can be varied from some positive value to infinity to some negative value depending on the distance of the lens from the reference surface. The improvement is particularly valuable in measuring long radius of curvature optical elements and systems.

3 Claims, 4 Drawing Figures

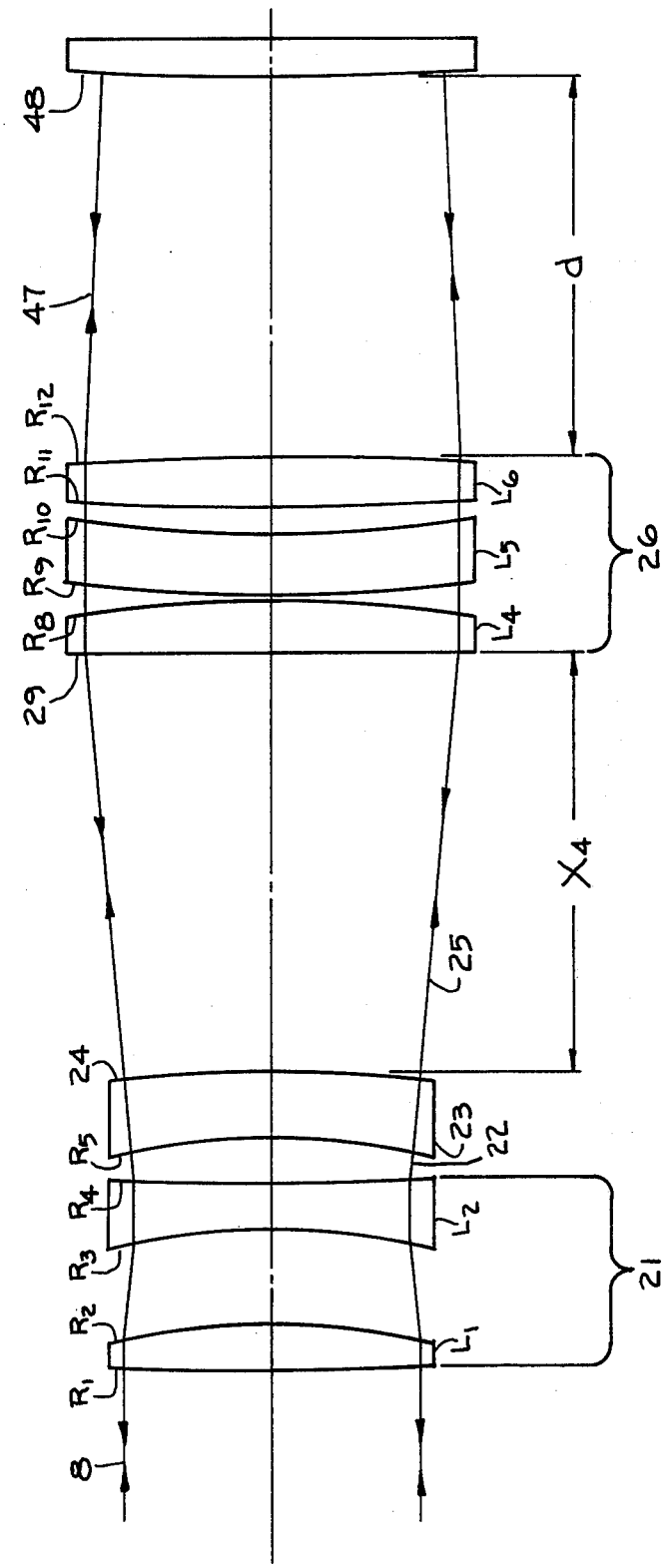

OPTICAL MEASURING DEVICE

BACKGROUND OF THE INVENTION

1. Field of the Invention

The present invention relates to apparatus useful for optical metrology. More particularly, the invention relates to a lens system which has a built-in reference surface and which provides an emerging wavefront of variable radius of curvature useful in an interferometer or differential autocollimator.

2. The Prior Art

The development of the laser has greatly expanded the utility of classical interferometers. The Fizeau interferometer, in particular, has become an extremely convenient and flexible instrument for a wide variety of optical metrology applications. A multiple beam spherical wavefront interferometer is discussed in detail in an article by Heintze et al in Applied Optics, Vol. 6, p. 1924, November 1967. A major difficulty arises with a spherical wavefront interferometer when slow, i.e., large focal ratio, elements or systems must be measured. In order to keep the distance between the article under test and the test apparatus short, the radius of curvature of the measurement wavefront must closely match that of the article under test. Therefore, the radius of curvature of the partially transmissive spherical reference surface must be selected to match closely that of the article under test. For precise optical measurements, a compact measurement set up is desirable both economically and technically because it minimizes the adverse effects of vibration and air turbulence.

Other types of apparatus have been used to test large radius optical elements and systems. For example, scatter plate interferometers and shearing type interferometers are two prominent means. However, these interferometers are not only difficult to use and align, but they are considerably less versatile than a Fizeau interferometer.

While these prior-art techniques are useful for some applications, they cannot be used in many optical metrology applications because of the specific, close match between the elements required to carry out the measurement and the parameters of the test article. To this end, a device is required for testing long radius of curvature optical elements and systems which does not require the specific, close match of expensive elements to the parameters of the test article.

OBJECTS OF THE INVENTION

It is the principal object of this invention to provide an improved means for measuring long radius of curvature optical elements and systems.

STATEMENT OF THE INVENTION

In accordance with the instant invention, I test long radius of curvature optical elements and systems with a Fizeau interferometer of a differential autocollimator using an optical measuring device in which a beam of collimated light is decollimated past a partially transmissive, partially reflective, nonrefractive reference surface, and the transmitted wavefront is reflected back from a test surface through the reference surface for comparison with the wavefront originally reflected from the reference surface, the improvement of which comprises placing between the reference surface and the test surface a collimating lens system whose distance from the reference surface can be varied to obtain a test wavefront whose effective radius of curvature can be varied to match the test surface from diverging for a concave test surface of long radius of curvature to $\infty$ for a flat test surface, to converging for a convex test surface of long radius of curvature. Preferably, the collimated light is decollimated with a negative decollimator and then passes through a nearly aplanatic, negative fused silica element with a convex, partially transmissive, partially reflective, non-refractive spherical reference surface to produce a reflected reference wavefront and a transmitted spherical wavefront.

THE DRAWINGS

In the drawings,

FIG. 4 is a schematic similar to FIG. 2, in which the test object is convex, with a long radius of curvature.

DETAILED DESCRIPTION OF THE INVENTION

Figure 1:
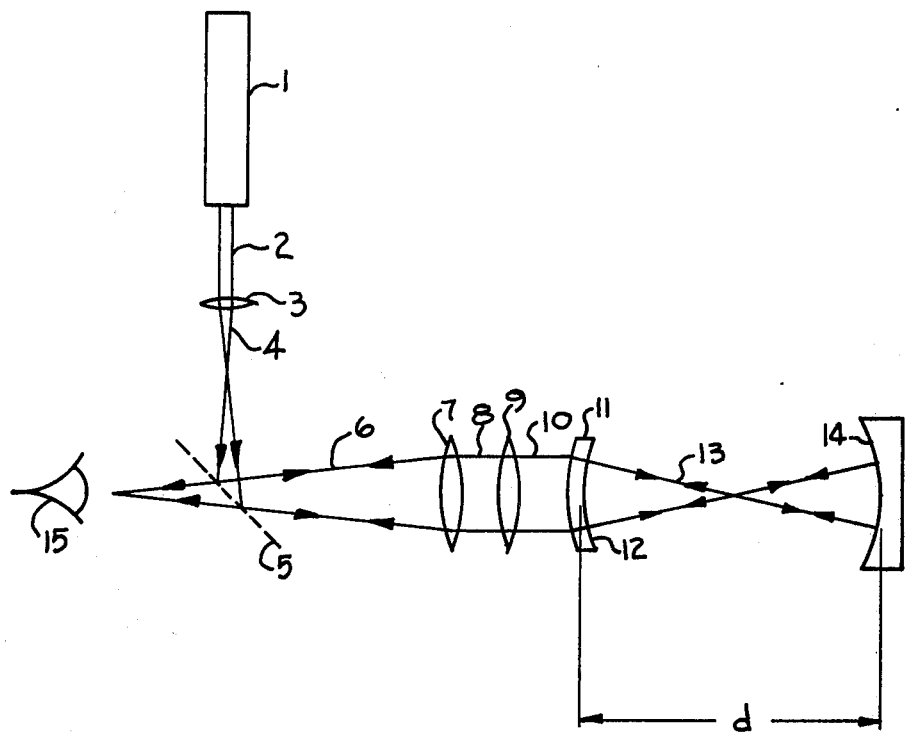
FIG. 1 is a schematic of a Fizeau spherical wavefront interferometer, i.e., prior art.

Description and Explanation of the Schematic in FIG. 1 (prior art)

FIG. 1 shows the layout of a typical Fizeau spherical wavefront interferometer. A light source such as a tungsten bulb, xenon bulb, light-emitting diode, laser diode, or other source of radiant energy, and most preferably a gas laser 1 provides optical energy. The output beam 2 is focused by lens 3 to produce the converging spherical wavefront 4. After passing through focus, wavefront 4 is reflected by beamsplitter 5. The diverging spherical wavefront 6 is converted to a collimated wavefront 8 by lens 7. Lenses 3 and 7 serve to expand the diameter of the beam 2. Lens 9 converts wavefront 8 to a converging spherical wavefront 10. Element 11 is a negative aplanatic element located in wavefront 10. Element 11 has a non-refractive, spherical reference surface 12 which is partially reflective and partially transmissive. The wavefront produced by the reflection of wavefront 10 from surface 12 is the reference wavefront. The wavefront transmitted by surface 12, wavefront 13 is the converging spherical test wavefront. Surface 14 is the surface under test, and it reflects the test wavefront 13. The interference of the reference and measurement wavefronts is viewed at 15.

FIG. 1, surface 14 is not restricted to being concave as shown, and lens 9 can be a negative lens combined with a convex reference surface 12.

The distance between surface 12 and surface 14 is given by $d = R_{12} \pm R_{14}$, where $R_{12}$ is the radius of curvature of surface 12, $R_{14}$ is the radius of curvature of surface 14, and the $+$ or $-$ sign is chosen based on the power of the surfaces. For commonly occuring aperture sizes and focal ratios, the distance $d$ can be unduly large. For example, a 4-inch aperture, $f/50$ sphere has a 400-inch radius of curvature. Furthermore, a slight change in the focal ratio, e.g., to $f/55$, changes the radius of curvature by 40 inches. Thus, the dilemma when testing slow elements becomes evident: either the reference element 11 closely matches the article under test or the distance, $d$, must be unduly large.

Figure 2:
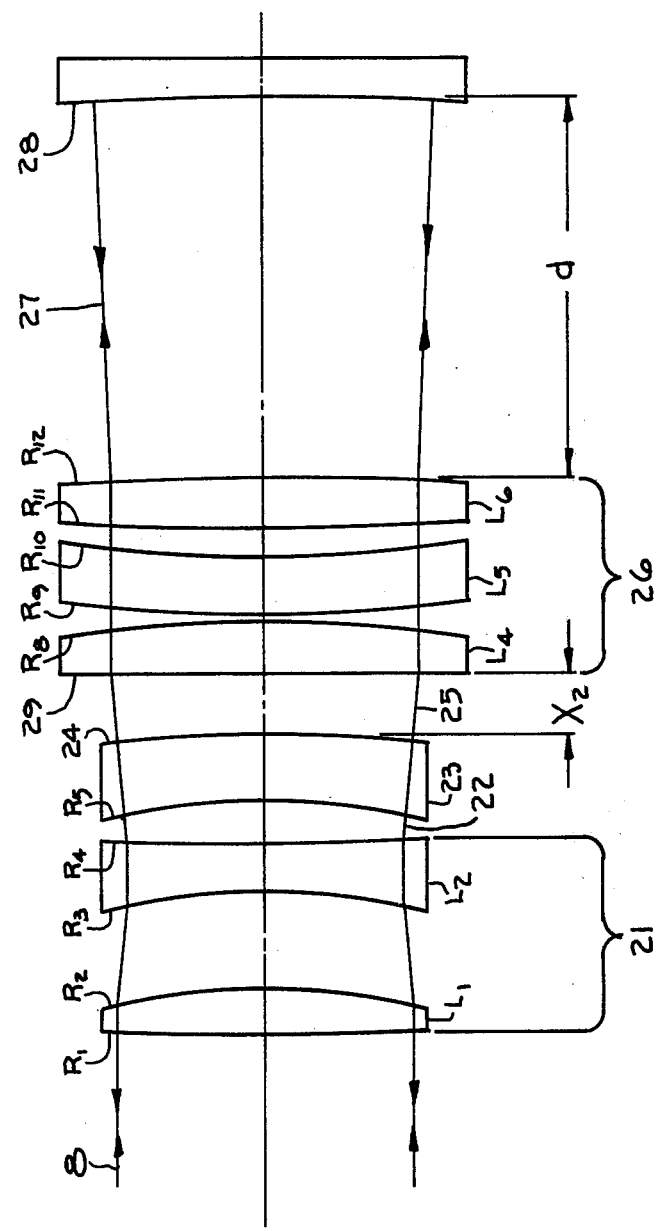
FIG. 2 is a schematic of a lens system useful for testing long radius of curvature optical elements and systems in which the test object is concave with a long radius of curvature.

Description and Explanation of the Schematic in FIG. 2

FIG. 2 is a schematic of a lens system useful for testing long radius of curvature optical elements and systems.

Referring to FIG. 2, the collimated beam 8 of a conventional Fizeau interferometer or of a differential autocollimator, enters an optical system which differs from the conventional. In this system, the collimated beam 8 is converted to a diverging wavefront 22 by a lens system 21, preferably consisting of two elements ($L_1$) and ($L_2$), in fixed relationship to each other, and having surfaces $R_1$, $R_2$, $R_3$ and $R_4$ as indicated. The diverging wavefront 22 then passes through a lens 23 preferably made of fused silica, fixed in position relative to lens system 21 having a first surface $R_5$, and a reference surface 24 which is non-refractive, convex, spherical, partially reflective, and partially transmissive. The wavefront produced by the reflection of wavefront 22 from the reference surface 24 is the reference wavefront; the wavefront 25 transmitted through the reference surface 24 is a diverging spherical wavefront. Lens system 26 is a collimating system which converts the wavefront 25 to a test wavefront 27; the wavefront 27 may be diverging, collimated or converging, depending on the distance $X_2$ between the lens system 26 and reference surface 24.

This lens system 26 preferably comprises three elements, $L_4$, $L_5$ and $L_6$ with surfaces 29, $R_8$, $R_9$, $R_{10}$, $R_{11}$ and $R_{12}$ all in fixed relationship to each other. However, the distance between the reference surface 24 and first surface 29 of the lens system 26 can be varied either by moving the lens system 26 relative to the reference surface 24 or by moving the combined lens system 21 and 23 relative to 26. I prefer to move the combined lens system 21 and 23 since it is a smaller package.

The lens system 26 must, of course, be designed and manufactured to yield very small wavefront errors, since it is in the measurement leg after the reference surface 24. The design of lens 26 is further constrained by the requirements that it must perform over a range of conjugates and that it must be sufficiently insensitive to mechanical tolerance during the relative movement between it and the lens system comprised of 21 and 23.

The design of such a lens system is rather straightforward, but it must be related to the design of the lenses 21 and 23 as well. The appropriate radii of curvature, axial distances and refractive indicies of the glasses used, can be varied to fit the general standards used by any particular optical manufacturer. The data on such a system as scaled for a 4-inch input beam, an $f/5.0$ diverging wavefront 25, and suitable for an accuracy $\lambda/8$ are set forth in the Table I below:

TABLE I

| Element | Surface | Radii (mm) | Axial distance between surfaces (mm) | Nd |
|---|---|---|---|---|
| $L_1$ | $R_1$ | 2590.3 | | |
| | | | 15.0 | 1.4875 |
| | $R_2$ | −232.7 | | |
| | | | 32.0 | |
| $L_2$ | $R_3$ | −232.7 | | |
| | | | 15.0 | 1.7618 |
| | $R_4$ | 2590.3 | | |
| | | | 15.0 | |
| 23 | $R_5$ | −232.7 | | |
| | | | 22.0 | 1.4585 |
| | 24 | −503.5 | | |
| | | | X | |
| | 29 | ∞ | | |
| $L_4$ | | | 17.0 | 1.5168 |

TABLE I-continued

| Element | Surface | Radii (mm) | Axial distance between surfaces (mm) | Nd |
|---|---|---|---|---|
| | $R_8$ | 459.3 | | |
| | | | 2.6 | |
| $L_5$ | $R_9$ | −541.5 | | |
| | | | 19.8 | 1.7173 |
| | $R_{10}$ | −453.9 | | |
| | | | 10.0 | |
| | $R_{11}$ | −1453.8 | | |
| $L_6$ | | | 16.0 | 1.5168 |
| | $R_{12}$ | 1162.0 | | |

Nd is the index of refraction referred to the d-line of sodium.

When the axial distance $X_2$ between reference surface 24 and surface 29 is 20.3 mm, the wavefront 27 has an $f$/No. of −50.

Figure 3:
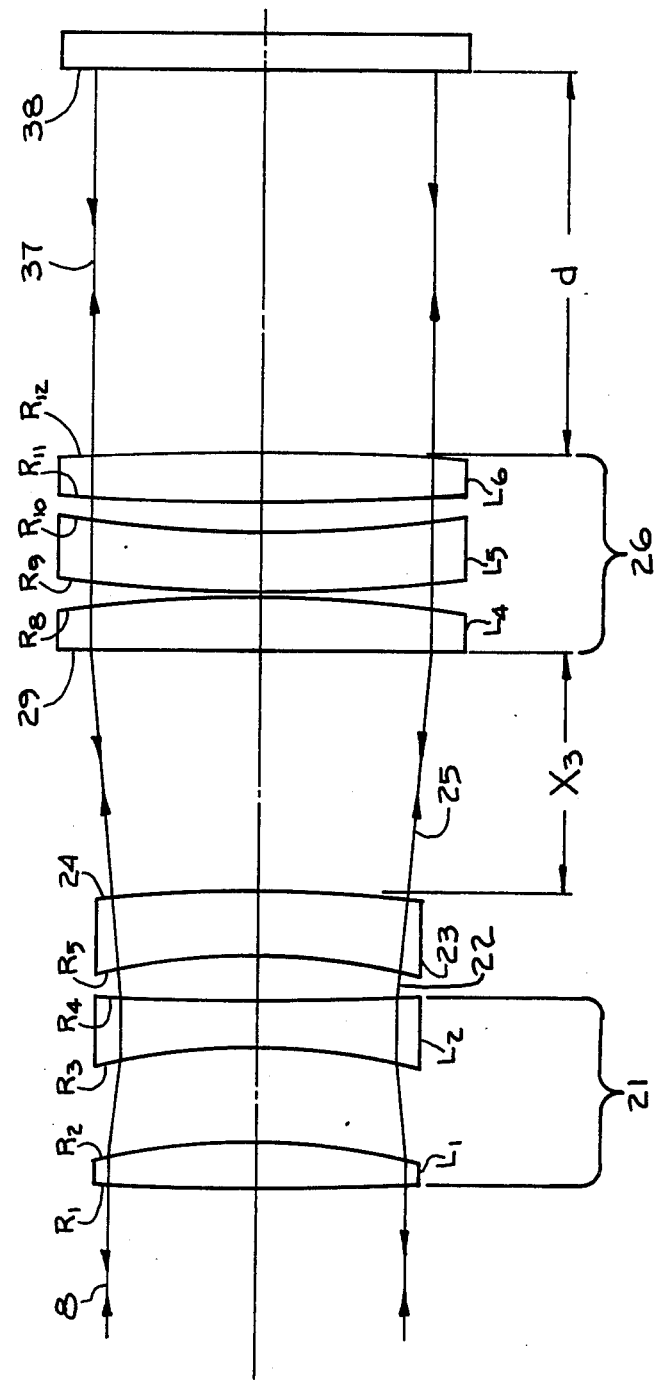
FIG. 3 is a schematic similar to FIG. 2, in which the test object is planar (radius of curvature $= \infty$).

Referring to FIG. 3, the schematic therein is identical with that of FIG. 2, except that the surface 29 is placed at a distance $X_3$ from the reference surface 24 such that the test wavefront 37 is collimated to provide for a planar test surface 38. Using the specific design detailed in Table I as scaled, the distance $X_3$ is 80.1 mm.

Referring to FIG. 4, the schematic is illustrated for a convex test surface 48 and a converging test wavefront 47. Using the same criteria and design as in FIGS. 1 and 2, an $f/50$ test wavefront is obtained when $X_4$ is 139.9 mm.

The device of this invention can be also used for example in the scanning differential photoelectric autocollimator described in the Hunter and Zanoni U.S. Patent Application Ser. No. 565525 filed on Apr. 7, 1975, now U.S. Pat. No. 3,977,789 issued Aug. 31, 1976.

While the system is theoretically workable by using the diverging wavefront 6 of FIG. 1, without the collimator 7 and the decollimator 21, such a scheme has mechanical and optical disadvantages, since lens 7 must be carefully aligned to wavefront 6. Moreover, for measurement of objects of small radii of curvature, it is generally desirable to operate the instrument without the lens system 26, in which event the collimator 7 and decollimator 21 are necessary.

Obviously, the specific embodiments of the invention disclosed can be altered without departing from the invention, which is defined in the claims.

What I claim is:

1. In an optical measuring device in which a beam of collimated light is decollimated by a decollimating system, is then passed through a partially transmissive, partially reflective, non-refractive spherical reference surface, and the transmitted wavefront is reflected back from a test surface through said reference surface for comparison with the wavefront originally reflected from said reference surface, the improvement which comprises mounting said reference surface in fixed relationship to said decollimating system on the same side of said decollimating system as said test surface, and placing between said reference surface and said test surface a collimating lens system whose distance from the reference surface can be varied to obtain a test wavefront whose radius of curvature can be varied to match the test surface, from diverging for a concave test surface of long radius of curvature, to infinity for a flat test surface, to converging for a convex test surface of long radius of curvature.

2. The device of claim 1, in which the optical measuring device is used in a Fizeau interferometer utilizing a laser as a source of light.

3. The device of claim 1, in which the reference surface is on a nearly aplanatic negative element made of fused silica and is convex to said element.

* * * * *